United States Patent
Schenk

(10) Patent No.: US 6,529,925 B1
(45) Date of Patent: Mar. 4, 2003

(54) METHOD FOR REDUCING THE CREST FACTOR OF A SIGNAL

(75) Inventor: Heinrich Schenk, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/433,384

(22) Filed: Nov. 3, 1999

(30) Foreign Application Priority Data

Nov. 3, 1998 (DE) .......................................... 198 50 642

(51) Int. Cl.[7] .......................... G06F 17/10; G06F 7/38; H04B 15/00
(52) U.S. Cl. ...................... 708/300; 708/445; 375/285; 375/296
(58) Field of Search ................................ 708/300, 445, 708/819, 5, 403–404, 270; 375/285, 296; 370/203

(56) References Cited

U.S. PATENT DOCUMENTS

| | | | |
|---|---|---|---|
| 3,952,189 A | * 4/1976 | Fabricius | .................... 708/270 |
| 4,843,562 A | * 6/1989 | Kenyon et al. | ................. 708/5 |
| 4,967,161 A | * 10/1990 | Furuhata et al. | ............ 708/819 |
| 5,636,247 A | * 6/1997 | Kamerman et al. | ......... 370/203 |
| 6,125,103 A | * 9/2000 | Bäuml et al. | ................ 370/203 |
| 6,128,351 A | * 10/2000 | Jones et al. | .................. 375/285 |
| 6,130,918 A | * 10/2000 | Humphrey et al. | ......... 375/285 |
| 6,178,158 B1 | * 1/2001 | Suzuki et al. | ................ 370/203 |
| 6,314,146 B1 | * 11/2001 | Tellado et al. | ............... 375/285 |

* cited by examiner

Primary Examiner—Tan V. Mai
(74) Attorney, Agent, or Firm—Laurence A. Greenberg; Werner H. Stemer; Gregory L. Mayback

(57) ABSTRACT

A method for reducing the crest factor of a signal, the signal being represented by a digital signal vector whose elements are sampled values of the signal. The method includes the steps of calculating a digital correction vector from the elements of the digital signal vector. Adding the digital correction vector and to the digital signal vector, and outputting a corrected digital signal vector.

7 Claims, 3 Drawing Sheets

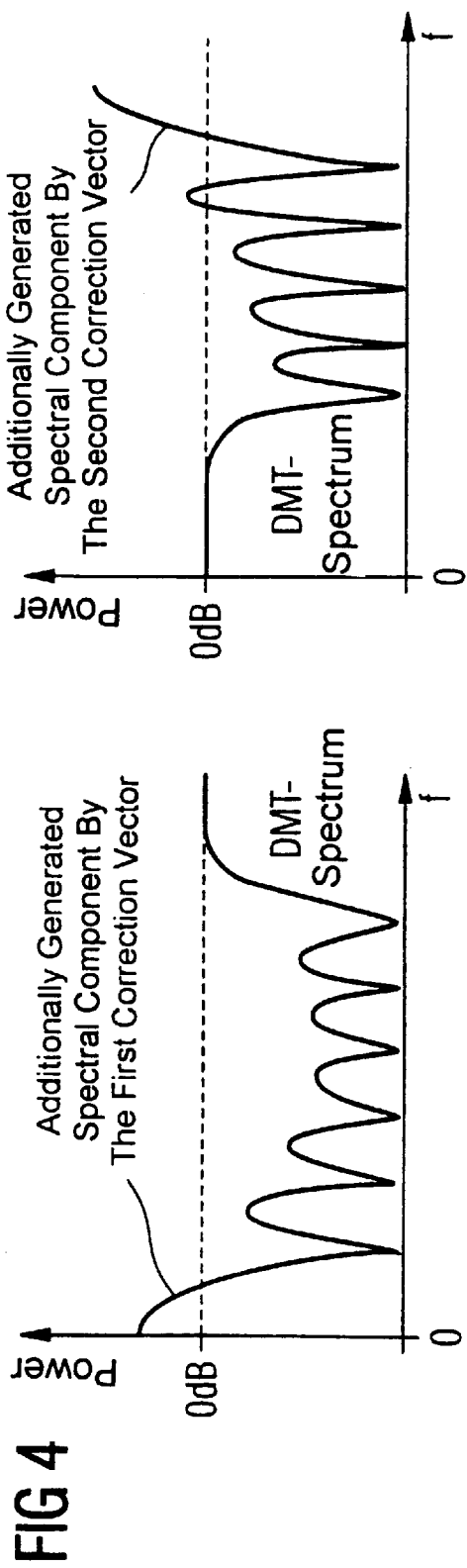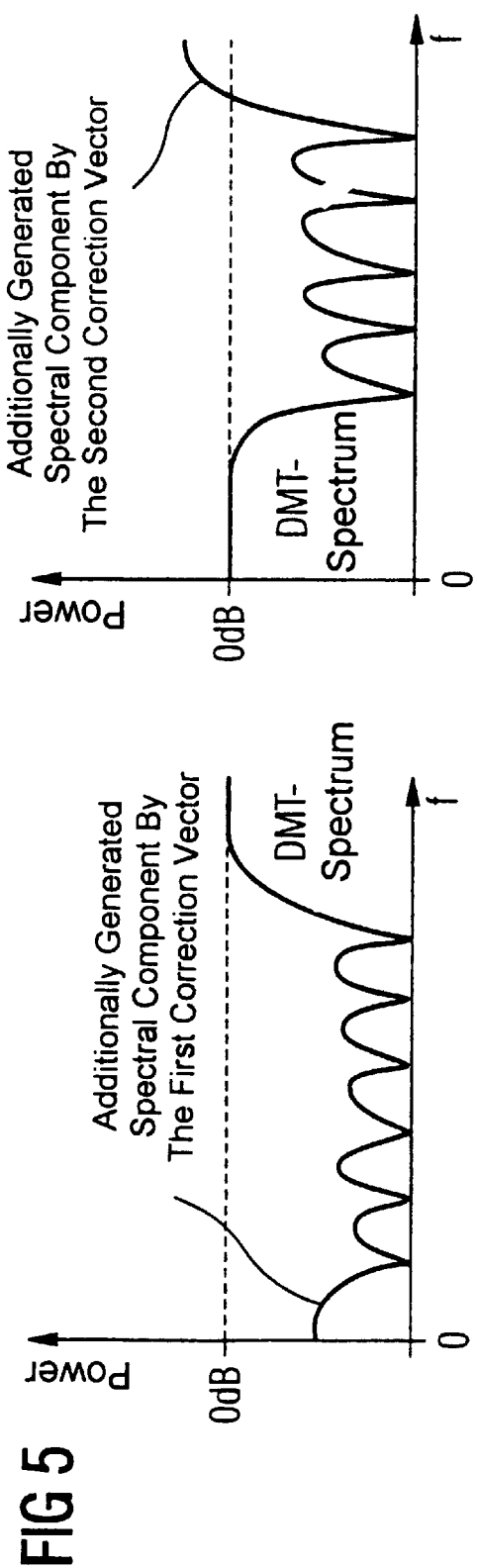
FIG 4
FIG 5

METHOD FOR REDUCING THE CREST FACTOR OF A SIGNAL

BACKGROUND OF THE INVENTION

Field of the Invention

The invention relates to a method for reducing the crest factor of a signal. The signal represented in the time domain by a digital signal vector having elements being sampled values of the signal.

The crest factor of a signal specifies the peak-to-average ratio (PAR) of the signal. A high crest factor of a signal entails a more complicated circuit engineering for signal processing than a low crest factor, since the circuits for signal processing must be configured for a large amplitude range.

In particular, signals that have been generated using discrete multi-tone modulation have a high crest factor. Discrete multi-tone modulation (DMT), and also multi-carrier modulation, are modulation methods that are particularly suitable for transmitting data via linearly distorting channels. Examples of fields of application for discrete multi-tone modulation are digital audio broadcast (DAB) under the designation of orthogonal frequency division multiplex (OFDM), and transmission of data via telephone lines under the designation of asymmetric digital subscriber line (ADSL).

A DMT transmission system has a coder which allocates to the individual carrier frequencies bits of a serial digital data signal which is to be transmitted, and generates a digital signal vector. The digital signal vector is transformed into the time domain by inverse fast Fourier transformation (IFFT). The transmitted signal represented by the transformed digital signal vector has an amplitude distribution that corresponds approximately to a Gaussian distribution. Large amplitudes occur in this case with the same probability as small amplitudes. The crest factor (peak-to-average ratio (PAR) of a signal) of the transmitted signal is therefore very large. A digital-to-analog converter downstream of the inverse fast Fourier transformation, and an analog output amplifier downstream, in turn, of the converter must therefore be configured for a large amplitude range. In order to avoid the overloading of the two circuits by transmitted signals with excessively large amplitudes, and to keep down the outlay on circuitry for the digital-to-analog converter and the analog output amplifier, the aim is therefore to reduce the crest factor of the transmitted signal.

Known methods employ unused carrier frequencies for the purpose of reducing the crest factor in the case of discrete multi-tone modulation for data transmission. Non-used carrier frequencies are employed as redundancy points for reducing the crest factor in a reference by M. Friese, titled "Mehrträgermodulation mit kleinem Crest-Faktor" ["Multi-Carrier Modulation With Small Crest Factor"], VDI Fortschritt-Berichte, Series 10, No. 472, Düsseldorf 1997. However, it is disadvantageous in this method that there is a need for a relatively high outlay on circuitry for the purpose of selecting and occupying the unused carrier frequencies, and that a receiver must be informed of which carrier frequencies have been used to reduce the crest factor.

SUMMARY OF THE INVENTION

It is accordingly an object of the invention to provide a method for reducing the crest factor of a signal which overcomes the above-mentioned disadvantages of the prior art methods of this general type, in which a simple method for reducing the crest factor is provided.

With the foregoing and other objects in view there is provided, in accordance with the invention, a method for reducing a crest factor of signals, which includes generating a digital signal vector having elements $y_k$ being sampled values of a signal and representing the signal in a time domain; calculating a digital correction vector from the elements of the digital signal vector; adding the digital correction vector and the digital signal vector resulting in a corrected digital signal vector; and outputting the corrected digital signal vector.

The method reduces large amplitudes of the signal represented by the digital signal vector, and thereby reduces the crest factor. The outlay for this method is advantageously low because of there being only a simple correction step to reduce the crest factor. The method can also be carried out many times in sequence on the respectively corrected digital signal vector, as a result of which the crest factor of the signal can possibly be reduced further. It is also advantageous that the digital correction vectors are calculated directly from the elements of the digital signal vector and that no other signals are required.

In a particularly preferred development of the method, the elements of the digital correction vector are calculated from the maximum (max) element and the minimum (min) element of the elements of the digital signal vector as follows:

$$\Delta y_{1k} = -0.5 \cdot (\max(y_k) + \min(y_k))$$

where $k=1,2,\ldots,N$.

It is advantageous in this case that the digital correction vector represents a signal whose frequency spectrum is at 0 Hz and scarcely influences the frequency spectrum of the signal represented by the digital signal vector.

In a particularly preferred development of the method, the elements of the digital correction vector can also be calculated from the maximum (max) element and the minimum (min) element of the elements of the digital signal vector as follows:

$$\Delta y_{2k} = (-1)^k \cdot (-0.5) \cdot (\max((-1)^k \cdot y_k) = \min((-1)^k \cdot y_k))$$

where $k=1,2,\ldots,N$.

It is advantageous in this case that the digital correction vector represents a signal whose frequency spectrum is half the sampling rate of the transmitted signal and scarcely influences the frequency spectrum of the signal represented by the digital signal vector.

In a preferred embodiment of the method, the corrected digital signal vector is expanded by M elements, the M elements being elements of the corrected digital signal vector. This measure —also termed cyclic prefix— advantageously assists a receiver to equalize the signal.

In a particularly preferred embodiment of the method, the addition of the digital correction vector and of the digital signal vector is carried out only when at least one of the elements of the digital signal vector exceeds a prescribable threshold value. The outlay on the method is advantageously reduced thereby once again, since no longer is every digital signal vector from a sequence of digital signal vectors corrected.

In a particularly preferred embodiment of the method, the addition of the digital correction vector and of the digital signal vector is carried out only when at least one of the elements of the digital signal vector falls below a prescribable threshold value.

The signal represented by the digital signal vector is preferably generated using a multi-carrier method (multi-carrier modulation system). Discrete multi-tone modulation is particularly preferred in this case as multi-carrier method. However, the method can be applied in principle to any multi-carrier method.

Other features which are considered as characteristic for the invention are set forth in the appended claims.

Although the invention is illustrated and described herein as embodied in a method for reducing the crest factor of a signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a pair of graphs showing spectral power densities after the reduction of the crest factor using the method according to the invention; and FIG. 5 is a pair of graphs showing the spectral power densities after the reduction of the crest factor using a development of the method according to the invention.

DESCRIPTION OF THE PREFERRED EMBODIMENTS

Figure 1:
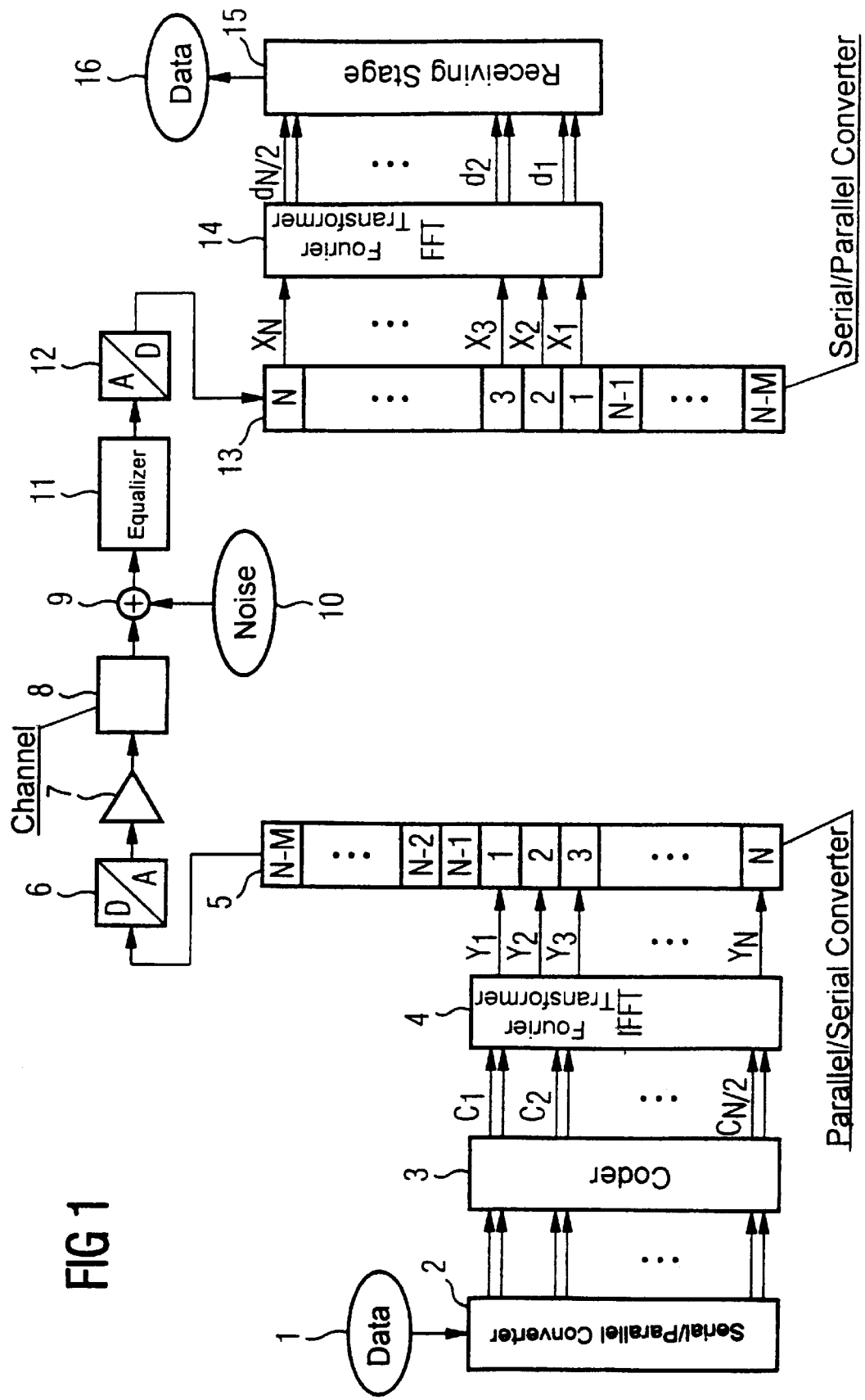
FIG. 1 is a diagrammatic, block diagram of a DMT transmission system.

In all the figures of the drawing, sub-features and integral parts that correspond to one another bear the same reference symbol in each case. Referring now to the figures of the drawing in detail and first, particularly, to FIG. 1 thereof, there is shown a block diagram of a DMT transmission system.

A data source 1 transmits digital data serially to a first serial/parallel converter 2 which packages serial digital data into data blocks each having N/2 sub-blocks.

A data block is transmitted in parallel to a coder 3 which distributes each of the N/2 sub-blocks of the data block to in each case one carrier frequency of the N/2 carrier frequencies available for data transmission, and for this purpose generates a first digital signal vector with N/2 elements $c_1$, $c_2, \ldots, c_{N/2}$.

Using a first Fourier transformer 4, which uses inverse fast Fourier transformation to calculate from the first digital signal vector with N/2 elements a second digital signal vector $y_1, y_2, \ldots, y_N$ with N elements (corresponding to N sampled values), the transmitted signal represented by the first digital signal vector is transformed from the frequency domain into the time domain. The N elements of the second digital signal vector $y_1, y_2, \ldots, y_N$ correspond in this case to N sampled values of the transmitted signal. Here, the transmitted signal represented by the N elements of the second digital signal vector $y_1, y_2, \ldots, y_N$ has a high crest factor.

The second digital signal vector is transmitted to a parallel/serial converter 5 which expands the N elements of the second digital signal vector by M (M<N) elements of the second digital signal vector once more to form a third digital signal vector $y_{N-M}, \ldots, y_{N-2}, y_{N-1}, y_1, y_2, y_3, \ldots, y_N$. As a result, the third digital signal vector has N+M elements. This measure is denoted as cyclic prefix.

The N+M elements of the third digital signal vector are fed serially to a digital-to-analog converter 6 whose analog output signal is amplified by a transmitting amplifier 7 for the purpose of transmission via a transmission channel 8. The transmitted signal is present at the output of the transmitting amplifier 7.

The transmission channel 8 distorts the transmitted signal linearly. A noise component 10 is superimposed on the transmitted signal by an adder 9 at the end of the transmission channel 8. Noise can be produced in this case at many points such as, for example, in the transmission channel 8 by cross talk, in the transmitting amplifier 7 or in the digital-to-analog converter 6.

The transmitted signal is received by an equalizer 11, equalized and fed to an analog-to-digital converter 12.

The serial digital output signal of the analog-to-digital converter 12 is fed to a second serial/parallel converter 13, which generates from the serial digital signal a fourth digital signal vector $x_1, x_2, \ldots, x_N$ with N elements.

The fourth digital signal vector is transformed in a second Fourier transformer 14, which calculates a fast Fourier transformation, from the time domain into the frequency domain. A fifth digital signal vector $d_1, d_2, \ldots, d_{N/2}$ with N/2 elements is then present at the output of the second Fourier transformer 14. The received signal represented by the digital signal vector is thereby mapped onto the various carrier frequencies of the DMT.

A receiving stage 15 can calculate the digital data from the amplitude and phase of the carrier frequency and feed the digital data to a data sink 16.

Figure 2:
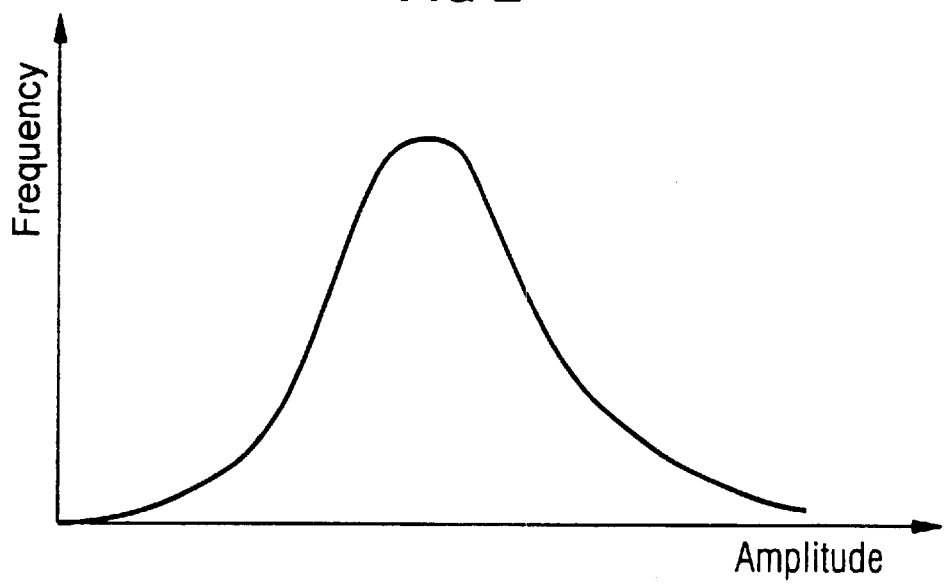
FIG. 2 is a graph showing an amplitude of frequency distribution of a transmitted signal modulated using discrete multi-tone modulation.

FIG. 2 shows a diagram with the amplitude frequency distribution of a transmitted signal modulated using discrete multi-tone modulation. In this case, the various amplitude values have a Gaussian distribution. The crest factor of a transmitted signal modulated with DMT is very high, since because of the Gaussian distribution of the amplitude values, individual, very high amplitude values also occur with a specific probability. The aim is to reduce the crest factor in order to keep the outlay on circuitry for the digital-to-analog converter 6 and the transmitting amplifier 7 as low as possible.

Figure 3:
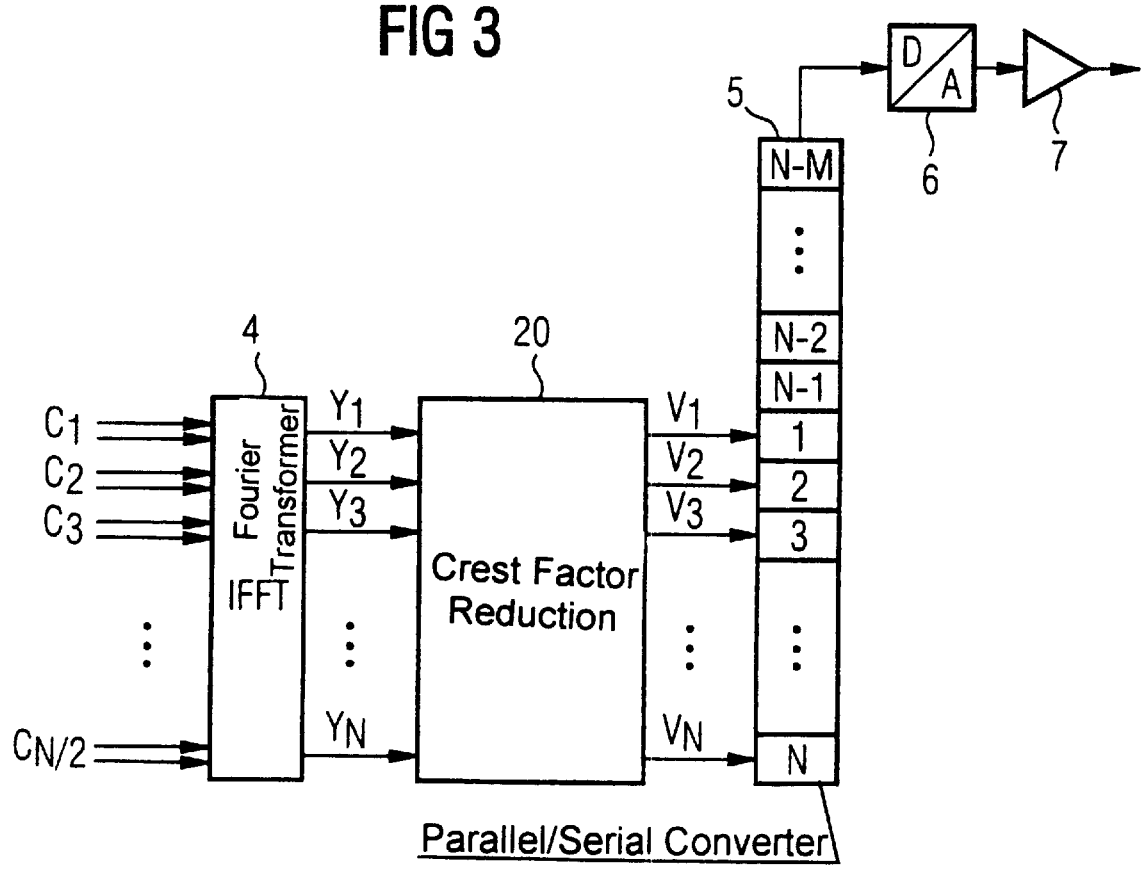
FIG. 3 is a block diagram of a DMT transmitter with a device for reducing a crest factor according to the invention.

FIG. 3 shows a block diagram of a DMT transmitter with a device for reducing the crest factor according to the invention.

The Fourier transformer 4 receives the first digital signal vector $c_1, c_2, \ldots, C_{N/2}$ with N/2 elements, and calculates therefrom the second digital signal vector $y_1, y_2, \ldots, y_N$ with N elements. The information contained in the first digital signal vector $c_1, c_2, \ldots, C_{N/2}$ is therefore frequency-domain information which is converted into the time domain by the inverse fast Fourier transformation.

The second digital signal vector $y_1, y_2, \ldots, y_N$ is fed to a crest factor reduction unit 20 in order to reduce the crest factor of the transmitted signal represented by the second digital signal vector. A first correction vector $\Delta y_1$, and thereupon a second correction vector $\Delta y_2$ are added to the second digital signal vector $y_1, y_2, \ldots, y_N$ in the crest factor reduction unit 20. Each of the two correction vectors $\Delta y_1$ and $\Delta y_2$ represents a signal which is added to the transmitted signal represented by the second digital signal vector. The additional spectral components thereby introduced are situated thereby respectively at 0 Hz (0-th spectral line) or half the sampling rate of the transmitted signal (N/2 spectral line), and thus outside the spectrum used by the transmitted signal. The sequence of the addition of the two correction vectors can be inverted, as a result of which the magnitude of additional spectral components introduced by the correction vectors is influenced.

The N elements $\Delta y_{1k}$ of the first correction vector $\Delta y_1$, and the N elements $\Delta y_{2k}$ of the second correction vector $\Delta y_2$ are calculated from the minimum and maximum elements of the N elements of the second digital signal vector $y_1, y_2, \ldots, y_N$ or of the second digital signal vector $y_1, y_2, \ldots, y_N$ weighted with $(-1)^k$:

$$\Delta y_{1k} = -0.5 \cdot (\max(y_k) + \min(y_k))$$

where $k = 1, 2, \ldots, N$ $$\Delta y_{2k} = -0.5 \cdot (-1)^k \cdot (\max((-1)^k \cdot y_k) + \min((-1)^k \cdot y_k))$$

where $k = 1, 2, \ldots, N$

The first correction vector $\Delta y_1$ has equal elements, and thereby represents the signal with a spectral component at 0 Hz. In terms of absolute value, the second correction vector $\Delta y_2$ has equal elements with alternating signs, and represents the signal with a spectral component at half the sampling rate.

The following computational example illustrates the calculation of a second corrected digital signal vector $y_1, y_2, \ldots, y_N$ in the crest factor reduction unit:

a). The second digital signal vector $y_1, y_2, \ldots, y_8$ has eight elements (N=8):

$$\begin{pmatrix} y_1 \\ y_2 \\ y_3 \\ y_4 \\ y_5 \\ y_6 \\ y_7 \\ y_8 \end{pmatrix} = \begin{pmatrix} 2 \\ 5 \\ 7 \\ 8 \\ 1 \\ 12 \\ 0 \\ 2 \end{pmatrix}$$

b). The minimum element is $y_7$, and the maximum element is $y_6$. The eight equal elements $\Delta y_{1k}$ of the first correction vector $\Delta y_1$ are therefore calculated as follows from the minimum element $y_7$ and the maximum element $y_6$:

$$\Delta y_{1k} = -0.5 \cdot (y_6 + y_7) = -0.5 \cdot (12 + 0) = -6$$

The first correction vector $\Delta y_1$ is therefore:

$$\Delta y_1 = -6 \cdot \begin{pmatrix} 1 \\ 1 \\ 1 \\ 1 \\ 1 \\ 1 \\ 1 \\ 1 \end{pmatrix}$$

The signal represented by the first correction vector is a direct signal and has a spectral line at 0 Hz in the frequency spectrum.

c). Adding the first correction vector $\Delta y_1$ to the second digital signal vector $y_1, y_2, \ldots, y_8$ yields a first corrected second digital signal vector $y'_1, y'_2, y'_3, y'_4, y'_5, y'_6, y'_7, y'_8$:

$$\begin{pmatrix} y'_1 \\ y'_2 \\ y'_3 \\ y'_4 \\ y'_5 \\ y'_6 \\ y'_7 \\ y'_8 \end{pmatrix} = \begin{pmatrix} -4 \\ -1 \\ 1 \\ 2 \\ -5 \\ 6 \\ -6 \\ -4 \end{pmatrix}$$

The first corrected second digital signal vector $y'_1, y'_2, y'_3, y'_4, y'_5, y'_6, y'_7, y'_8$ now has an element $y'_6$ and $y'_7$ of equal size in terms of absolute value. Furthermore, the peak value of the first corrected second digital signal vector has been reduced from 12 upstream of the crest factor reduction unit to 6 downstream of the crest factor reduction unit. The signal represented by the first corrected second digital signal vector $y'_1, y'_2, y'_3, y'_4, y'_5, y'_6, y'_7, y'_8$ now additionally has in the frequency spectrum at 0 Hz components which have been added by the signal which is represented by the first correction vector.

The crest factor reduction unit has reduced the crest factor such that downstream circuits such as, for example, an amplifier or an analog-to-digital converter require a smaller dynamic range and can be configured more simply in terms of circuit engineering.

The further steps now following for crest factor reduction unit do not deliver a further improvement in every case.

d). The eight elements $\Delta y_{2k}$ of the second correction vector $\Delta y_2$ are calculated as follows from the maximum and minimum elements of the elements $y'_1, y'_2, \ldots, y'_8$, weighted with $(-1)k$ of the second digital signal vector:

$$\Delta y_{2k} = (-1)^k \cdot (-0.5) \cdot ((-1)^6 \cdot y'_6 + (-1)^8 \cdot y'_8) = (-1)^k \cdot (-0.5) \cdot (6-4) = (-1)^k \cdot (-1)$$

The second correction vector $\Delta y_2$ is therefore:

$$\Delta y_2 = -1 \cdot \begin{pmatrix} -1 \\ 1 \\ -1 \\ 1 \\ -1 \\ 1 \\ -1 \\ 1 \end{pmatrix}$$

The signal represented by the second correction vector is a periodic signal which has a spectral line at half the sampling frequency of the transmitted signal.

e). A twice-corrected second digital signal vector $v_1, v_2, \ldots, v_8$ is yielded by adding the second correction vector $\Delta y_2$ to the first corrected second digital signal vector $y'_1, y'_2, \ldots, y'_8$:

$$\begin{pmatrix} v_1 \\ v_2 \\ v_3 \\ v_4 \\ v_5 \\ v_6 \\ v_7 \\ v_8 \end{pmatrix} = \begin{pmatrix} -3 \\ -2 \\ 2 \\ 1 \\ -4 \\ 5 \\ -5 \\ -5 \end{pmatrix}$$

In terms of absolute value, the twice-corrected second digital signal vector $v_1, v_2, \ldots, v_8$ has a peak value of 5 by contrast with the second digital signal vector $y_1, y_2, \ldots, y_8$ which has a peak value of 12 before the crest factor reduction unit. By contrast with the first corrected second digital signal vector $y'_1, y'_2, \ldots, y'_8$, the peak value has once again been reduced by 1 in terms of absolute value.

Overall, the crest factor reduction unit has reduced the peak value of the second digital signal vector $y_1, y_2, \ldots, y_8$ in terms of absolute value. As a result, the dynamic range of the downstream digital-to-analog converter 6 can be smaller than before a crest factor reduction unit.

The two diagrams, represented in FIG. 4, with the spectral power density after a reduction of the crest factor using the method according to the invention show that in addition to the spectrum generated by the DMT the first and second correction vectors generate in the frequency spectrum frequency bands at 0 Hz and half the sampling frequency (N/2 spectral line).

In a development of the method according to the invention, it is not necessary for each block to be corrected after the inverse fast Fourier transformation. A correction can be carried out as a function of threshold values that are exceeded or fallen below by individual values of a block. The frequency bands additionally generated by a correction are thereby reduced. The two diagrams, represented in FIG. 5, with the spectral power density after a reduction of the crest factor show in conjunction with the above development of the method according to the invention that the power of the frequency bands generated by the correction is substantially lower than in the case of a correction of each block.

I claim:

1. A method for reducing a crest factor of signals, which comprises:

generating a digital signal vector having elements $y_k$ being sampled values of a signal and representing the signal in a time domain;

calculating a digital correction vector from the elements of the digital signal vector;

calculating elements $\Delta y_{1k}$ of the digital correction vector from a maximum (max) element and a minimum (min) element of the elements $y_k$ of the digital signal vector as follows:

$$\Delta y_{1k} = -0.5 \cdot (\max(y_k) + \min(y_k))$$

where $k=1,2,\ldots,N$;

adding the digital correction vector and the digital signal vector resulting in a corrected digital signal vector; and outputting the corrected digital signal vector.

2. The method according to claim 1, which comprises expanding the corrected digital signal vector by M elements, the M elements being elements of the corrected digital signal vector.

3. The method according to claim 1, which comprises carrying out the adding step of adding the digital correction vector and the digital signal vector only if at least one of the elements $y_k$ of the digital signal vector exceeds a prescribable threshold value.

4. The method according to claim 1, which comprises carrying out the adding step of adding the digital correction vector and the digital signal vector only if at least one of the elements $y_k$ of the digital signal vector falls below a prescribable threshold value.

5. The method according to claim 1, which comprises generating the signal represented by the digital signal vector using a multi-carrier method.

6. The method according to claim 5, which comprises generating the signal represented by the digital signal vector using discrete multi-tone modulation.

7. A method for reducing a crest factor of signals, which comprises:

generating a digital signal vector having elements $y_k$ being sampled values of a signal and representing the signal in a time domain;

calculating a digital correction vector from the elements of the digital signal vector;

calculating elements $\Delta y_{2k}$ of the digital correction vector from a maximum (max) element and a minimum (min) element of the elements $y_k$ of the digital signal vector as follows:

$$\Delta y_{2k} = (-1)^k \cdot (-0.5) \cdot (\max((-1)^k \cdot y_k) + \min((-1)^k \cdot y_k))$$

where $k=1,2,\ldots,N$;

adding the digital correction vector and the digital signal vector resulting in a corrected digital signal vector; and outputting the corrected digital signal vector.

* * * * *